Nov. 25, 1930.  B. R. BENJAMIN  1,782,560
TRACTOR STALK CHOPPER
Filed March 1, 1929   3 Sheets-Sheet 1

Inventor
Bert R. Benjamin
By
Atty.

Nov. 25, 1930.     B. R. BENJAMIN     1,782,560
TRACTOR STALK CHOPPER
Filed March 1, 1929     3 Sheets-Sheet 3

Inventor
Bert R. Benjamin
By
Atty.

Patented Nov. 25, 1930

1,782,560

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

TRACTOR STALK CHOPPER

Application filed March 1, 1929. Serial No. 343,578.

The present invention relates to improvements in machines for chopping or cutting standing stalks into small sections during travel of the machine along a plant row, and is more particularly directed to means for producing a self-propelled machine of that class, preferably by provision of stalk cutting mechanism in the nature of an attachment designed for combination with tractors of standard types.

The objects of the invention are attained by providing a novel form of two-row chopping mechanism designed for attachment to the forward end of a straddle-row tractor of a well known type, but readily adaptable to other types, and forming, in combination with the tractor, a stalk chopping machine in which the chopping unit comprises a depending, forwardly inclined cutter shaft disposed at the side of the tractor and driven therefrom. Further characteristics of the invention as well as other purposes and advantages embodied therein will be made apparent in the following more detailed description of the preferred organization and details of construction in which the invention resides.

A preferred embodiment of the invention is illustrated in the accompanying drawings, where:

Figure 5 is an enlarged detail section substantially on the line 5—5 of Figure 2, showing a portion of the drive shaft and its connection to a cutter shaft.

Figure 1:
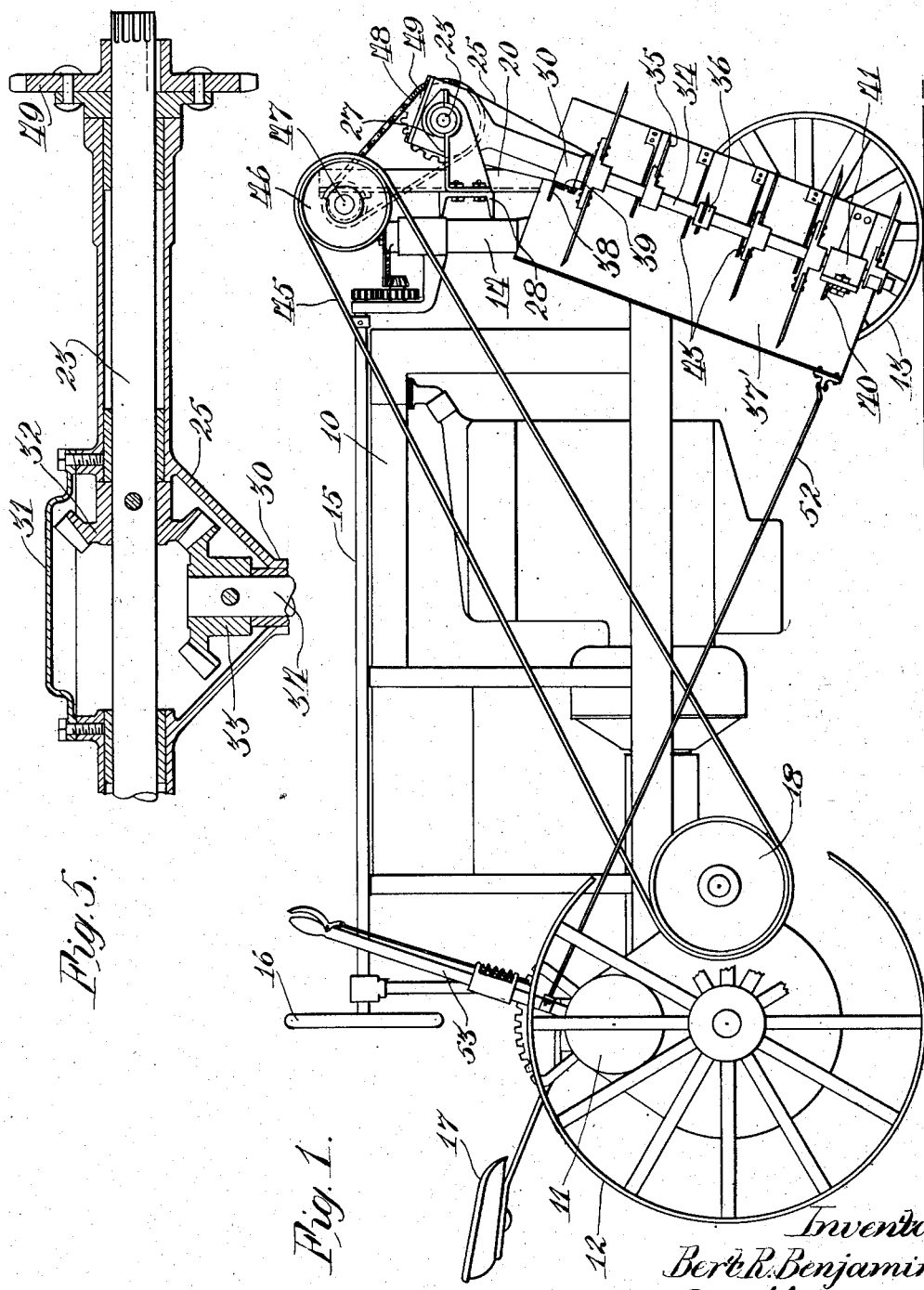
Figure 1 is a side elevation of the stalk chopping mechanism shown in position on a tractor.

In the present instance, the invention has been illustrated in combination with a wide tread tractor of the so-called tricycle type and comprising a narrow, longitudinal body portion 10 carrying the engine etc., and a rear axle structure 11 supported on traction wheels 12, which are spaced to span two plant rows of such crops as corn or cotton. The forward end of the tractor is supported on a dirigible truck having a closely spaced pair of wheels 13. This truck has a vertical spindle journaled in a supporting casting or cross-head 14 at the forward end of the tractor, and the upper end of the vertical standard of the truck is connected as by a quadrant and gearing to a steering shaft 15 having a steering wheel 16 adjacent the operator's station or seat 17. The tractor is provided with a laterally extending pulley shaft and pulley 18 which is driven through the transmission of the tractor. As the tractor itself is not part of the present invention, except as it enters into the combination embodying the invention, further description thereof is believed to be unnecessary.

Figure 3:
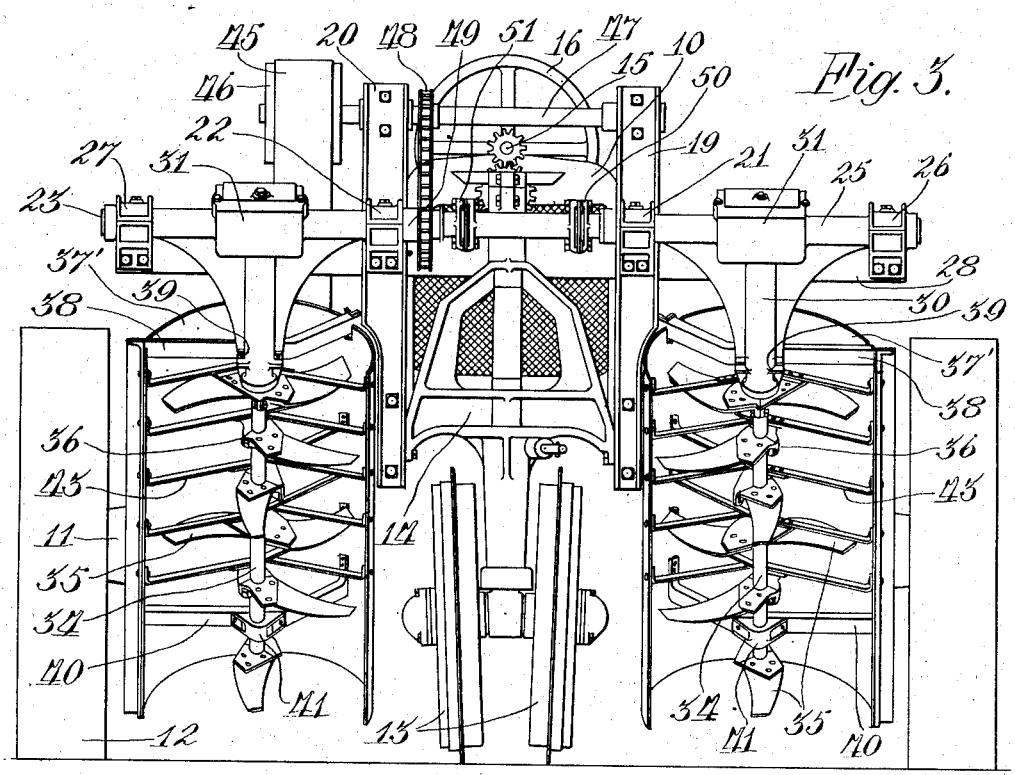
Figure 3 is a front elevation of the chopping mechanism of Figures 1 and 2.

In the practice of the invention supporting means for a pair of stalk chopping units is mounted on the front end of the tractor, and this supporting means may comprise a pair of upright members or bars 19, 20, the lower ends of which are bolted or otherwise secured to the sides of the front casting or cross-head 14 of the tractor. The supporting members 19 and 20 may extend upwardly to points somewhat above the radiator of the tractor, as seen in Figure 3. These members are provided above their centers with bearing boxes 21 and 22 in which there is journaled a transverse supporting and driving shaft 23. The ends of this shaft extend horizontally beyond the sides of the tractor body and substantially bridge the space between the sides of the tractor body and the tread line of the traction wheel at each side. Each of the projecting ends of the shaft 23 has journaled on it a T-shaped housing 25. The cross member or head of this housing includes end sleeve portions which receive the shaft 23 and extend from the bearing on one of the supporting members, as at 21, to an outer bearing box 26, 27 supporting the ends of the shaft 22. The bearing boxes 26, 27 are secured to a cross member 28 which is fixed to the rear surfaces of the vertical bars 19 and 20 in parallel relation to the shaft 23.

Figure 4:
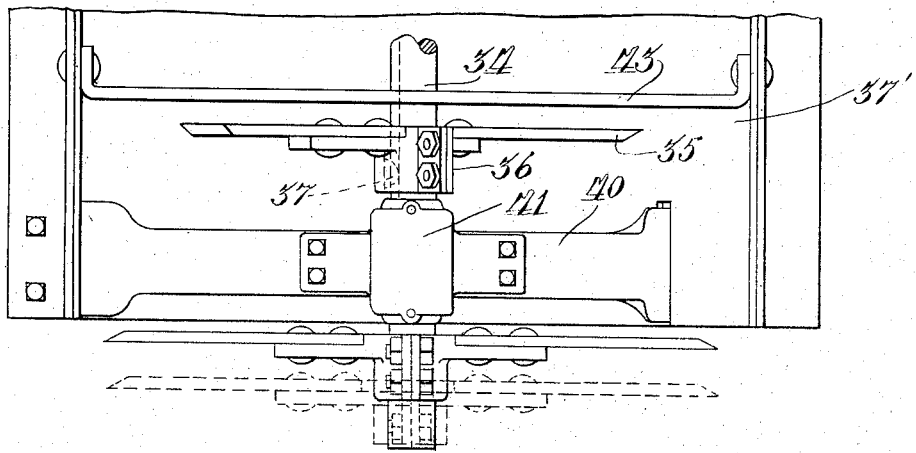
Figure 4 is a detail view on an enlarged scale showing the lower end of a cutter shaft and its supporting bearing.

A rigid support for the shaft 23 is thereby provided and the housings 25 are retained in position while being free to swing about the axis of the shaft 23. Each of the housings 25 has its stem formed as a depending sleeve portion 30, and a central, enlarged portion 31 of the casing (Figure 3) houses bevel pinions 32, 33, the first of which is on the shaft 23 and the second, on the upper end of a depending cutter shaft 34 which is supported in the sleeve 30 of the casting and extends downwardly beyond the same to a point adjacent the ground line. Each of these cutter shafts 34 is provided with a series of cutter blades or knives 35, which may be of the curved form shown and which are preferably disposed in offset or staggered relation radially of the shaft, as shown. The knives 35 are preferably secured to collars 36 (Figure 4) which are keyed to the shaft 34, as at 37. The collars 36, which are clamped to the shaft, may accordingly be adjusted vertically, as indicated in dotted lines at the lower end of Figure 4. Each of the chopping units comprises an arcuate shield 37 which is opened at the front and surrounds the cutter shafts and knives thereon at the sides and rear. This shield is supported on an upper, transverse bar 38 which is secured to the stem portion of the T-shaped housing 25, as at 39. A lower transverse bar 40 connects the sides of the shield to the lower end of the shaft 34 through a bearing 41, in which the lower end of the shaft is journaled.

Between the upper and lower supporting cross bars for the shield 38 and 40 there is provided a series of slightly arcuate, flat cross bars or blades 43, which connect the opposite sides of the shield 37′ and pass just behind the cutter shaft 34. These blades 43 are arranged in alternating relation to the knives 35 and serve as stop bars against which the stalks are held at the instant of the action of the knives thereon. The T-shaped housing 25 together with the shaft 34 and shield 37′ comprise the chopping unit which, it will be understood, is pivotally suspended from the shaft 23.

The chopping units are driven from the power plant of the tractor and the drive may be transmitted from the pulley 18 through a belt 45 to a pulley 46 on one end of a countershaft 47 journaled in bearings on the upper ends of the supporting members 19 and 20. A counter-shaft 47 is provided with a sprocket pinion carrying a sprocket chain 48 which engages the sprocket wheel 49 secured on shaft 23, as seen in Figure 5. The shaft 23, though preferably made in sections, is rigidly connected to form a unit, as by splined joints at 50 and 51, and power imparted to the sprocket wheel 49 will accordingly rotate shaft 23 as a whole, and, through the pinions 32 and 33, the cutter shafts will likewise be driven.

The cutter shafts extend at each side of the steering truck to a point adjacent the ground line and are supported in a forwardly inclined position as by means of adjusting links 52, which are attached to the lower rear portion of the shields 37′ and extend to hand levers 53 pivoted on the axle structure of the tractor adjacent the operator's station, and adapted to be locked at different positions of adjustment to vary the inclination of the chopping units, or raise the lower ends entirely away from the soil for transport purposes, as will be readily understood. The inclined position of the cutter shafts provides for gradual engagement of the standing stalks first by the upper knives and then by the lower knives in succession. A diagonal cut is thus given the stalks and less resistance is offered to the action of the knives. The location of the chopping units at either side of the truck is important as the truck wheels act as gauge wheels for the chopping units.

Figure 2:
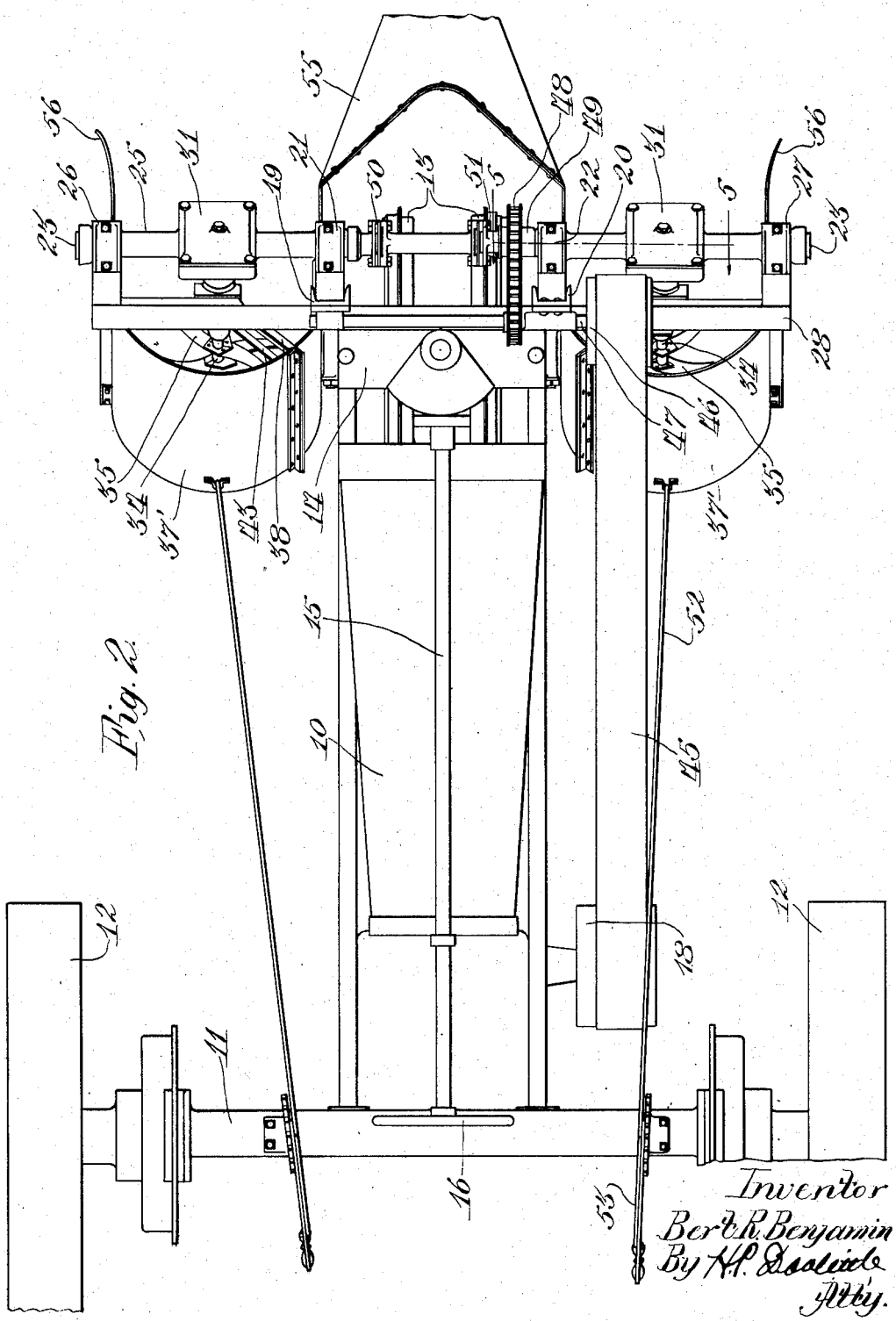
Figure 2 is a plan view of the same.

In order to protect the truck and move fallen or bent stalks laterally into the path of the chopper units, a V-shaped shield 55 (Figure 2) may be provided in front of the truck, and the arcuate shield 37′ may be provided with extensions 56 for moving the stalks inwardly to the knives.

There has accordingly been provided a stalk chopping machine including a self-propelled vehicle on which chopping units including inclined cutter shafts are adjustably suspended at the side of the forward steering wheels of the vehicle or tractor in position to engage a row of standing stalks and subject the stalks to chopping action gradually from the upper ends thereof downwardly with each knife stroke at an oblique angle to the stalk and in which the inclination of the cutter shaft and the guiding and operation of the chopping units are under control of the driver of the tractor stationed on the rear end thereof. Modifications of the preferred structure herein disclosed are obviously possible without departure from the invention as defined in the following claims.

What is claimed is:

1. The combination with a tractor of a downwardly and rearwardly extending cutter shaft located at the side of the tractor, means supporting the cutter shaft on the tractor, and means for driving the cutter shaft by power from the tractor.

2. The combination with a tractor of a supporting shaft projecting horizontally at one side thereof, a downwardly and rearwardly extending cutter shaft pivotally suspended from said shaft, means for driving the cutter shaft by power from the tractor, and an adjustable connection between the lower portion of the cutter shaft and the tractor supporting the cutter shaft in said position.

3. The combination with a tractor of a supporting shaft journaled on the tractor and projecting laterally beyond one side thereof, a depending cutter shaft pivotally mounted on the projecting end of the supporting shaft, gearing connecting the supporting shaft and cutter shaft, means on the tractor for adjusting the cutter shaft about the axis of the supporting shaft, and driving means connecting the supporting shaft to the tractor power plant.

4. The combination with a tractor of a supporting shaft journaled on the tractor and projecting laterally beyond one side thereof, a depending cutter shaft pivoted at its upper end to the supporting shaft and extending therefrom downwardly and rearwardly, gearing connecting the supporting shaft and the cutter shaft, an adjustable connection between the lower end of said shaft and the tractor, and driving means connecting the supporting shaft to the tractor power plant.

5. A two-row stalk chopper comprising the combination with a vehicle having rear wheels spaced to span two plant rows and a central front steering truck, of a transverse shaft supported on the front end of the vehicle above the truck and projecting horizontally beyond each side of the truck, downwardly extending cutter shafts supported on the projecting ends of the transverse shaft within the longitudinal planes of the rear wheels and extending downwardly and rearwardly to points adjacent the ground line and behind the truck, and means on the vehicle for driving the cutter shafts.

6. A stalk chopper comprising a supporting vehicle, a downwardly extending cutter shaft mounted thereon, means on the vehicle for driving the shaft, a series of radial knives secured to the shaft, a forwardly facing arched shield supported on the shaft and enclosing the knives, and bars extending across the shield adjacent the paths of the knives.

7. A stalk chopping attachment for tractors comprising a supporting shaft, means on the central portion of said shaft for mounting it on a tractor with the free ends of the shaft extending horizontally beyond the tractor at each side, depending cutter shafts pivotally suspended from the ends of the supporting shaft, and driving means for the cutter shafts carried on said supporting means and adapted to receive power from the tractor power plant.

8. A stalk chopping attachment for tractors comprising upright supporting means adapted to be secured to the front end of a tractor, a supporting shaft having its central portion journaled on said supports and its ends extending from either side thereof, a housing pivotally mounted on each end of the supporting shaft and formed with a depending bearing sleeve, a depending cutter shaft journaled in each sleeve, gearing within the housings connecting the supporting shaft and the cutter shafts, and means on the upright supporting means for driving the supporting shaft by power derived from the tractor.

In testimony whereof I affix my signature.
BERT R. BENJAMIN.